No. 710,449. Patented Oct. 7, 1902.
J. W. GONCE.
COMBINATION LOCK.
(Application filed Feb. 12, 1902.)

(No Model.) 3 Sheets—Sheet 1.

WITNESSES:

INVENTOR
John W. Gonce
BY
ATTORNEYS

THE NORRIS PETERS CO., PHOTO-LITHO., WASHINGTON, D. C.

No. 710,449. Patented Oct. 7, 1902.
J. W. GONCE.
COMBINATION LOCK.
(Application filed Feb. 12, 1902.)
(No Model.) 3 Sheets—Sheet 2.
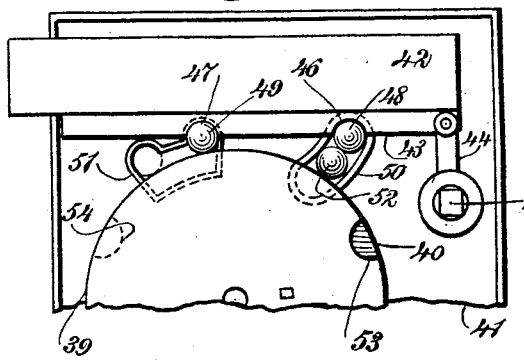
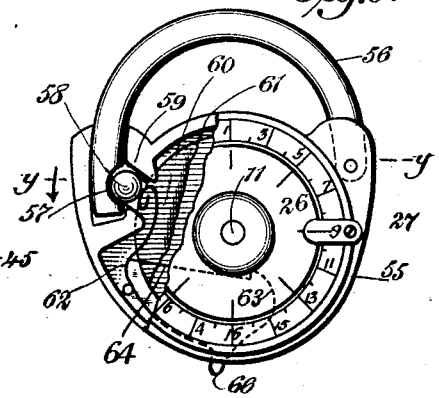
WITNESSES:
INVENTOR
John W. Gonce
BY
ATTORNEYS
THE NORRIS PETERS CO., PHOTO-LITHO., WASHINGTON, D. C.

No. 710,449. Patented Oct. 7, 1902.
J. W. GONCE.
COMBINATION LOCK.
(Application filed Feb. 12, 1902.)

(No Model.) 3 Sheets—Sheet 3.

WITNESSES:

INVENTOR
John W. Gonce
BY
ATTORNEYS

UNITED STATES PATENT OFFICE.

JOHN WISDOM GONCE, OF KINDERHOOK, ALABAMA.

COMBINATION-LOCK.

SPECIFICATION forming part of Letters Patent No. 710,449, dated October 7, 1902.

Application filed February 12, 1902. Serial No. 93,678. (No model.)

*To all whom it may concern:*

Be it known that I, JOHN WISDOM GONCE, a citizen of the United States, and a resident of Kinderhook, in the county of Jackson and State of Alabama, have invented a new and Improved Combination-Lock, of which the following is a full, clear, and exact description.

This invention relates to improvements in keyless combination-locks, the object being to provide a lock of this character of simple construction, not liable to get out of order, and comparatively cheap to manufacture.

I will now describe a combination-lock embodying my invention and then point out the novel features in the appended claims.

Reference is to be had to the accompanying drawings, forming a part of this specification, in which similar characters of reference indicate corresponding parts in all the figures.

Figure 1:
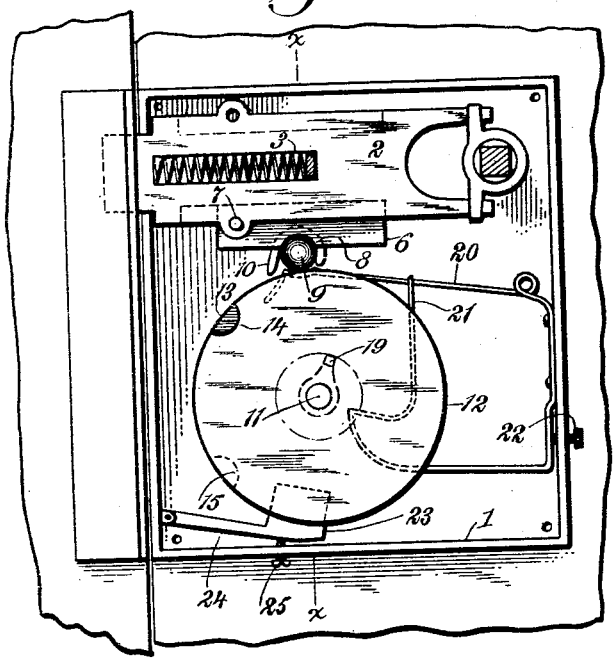
Figure 2:
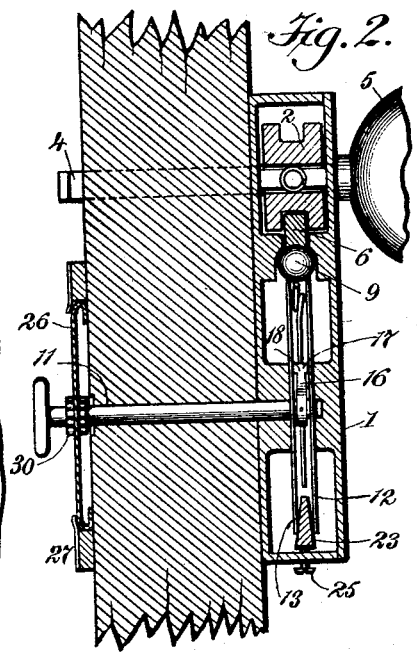
Figure 3:
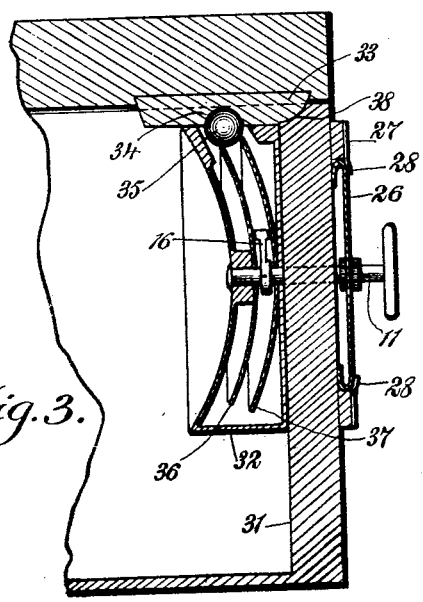
Figure 4:
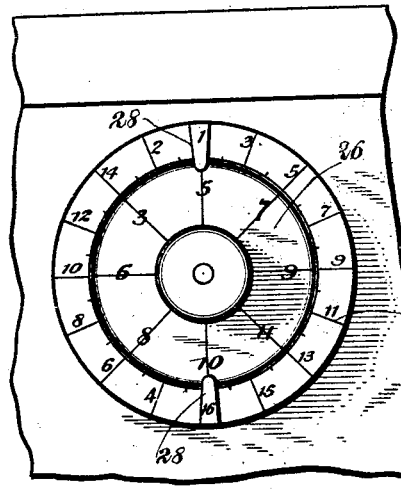
Figure 20:
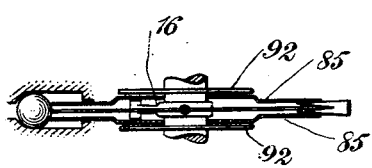
Figure 21:
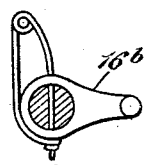

Figure 1 is an elevation of a lock embodying my invention with the outer plate of the casing removed. Fig. 2 is a section on the line $x$ $x$ of Fig. 1. Fig. 3 is a sectional view showing the lock as arranged for a drawer or the like. Fig. 4 is a face view of the dial and indicator-plate employed. Fig. 5 shows a modification in which the lock is arranged for a safe or store door. Fig. 6 is a modification showing the improvement as applied to a padlock. Fig. 7 is a similar view, but showing the shackle as released. Fig. 8 is a section on the line $y$ $y$ of Fig. 6. Fig. 9 is a section on the line $z$ $z$ of Fig. 7. Fig. 10 is a sectional detail of a modification in which three tumbler-disks are employed. Fig. 11 is a face view of the center disk used in the construction shown in Fig. 10. Figs. 12, 13, and 14 show different methods of securing the pointer-disks. Figs. 15, 16, 17, and 18 show modifications in the padlock construction. Fig. 19 shows a modified tumbler-disk. Fig. 20 shows a section thereof, and Fig. 21 shows a modified form of spring tripping device employed.

Referring to the example of my improvement shown in Figs. 1 and 2, 1 designates the lock-casing, designed to be secured to the inner side of a door; but it may be mortised in the door. Movable in the casing is the locking-bolt 2, which is pressed forward or to locking position by means of a spring 3, and it may be normally operated by turning the spindle 4. On the inner end of this spindle is a knob 5. A knob may also be placed on the outer end; but it is not deemed necessary to show it herein. A keeper-block 6 is adapted to be carried by the bolt 2, but normally to remain stationary, permitting the bolt to move back and forth. This block 6 is inserted in a channel formed in the edge of the bolt, and it may be here stated that a channel will be formed in each edge, so that the lock may be used on either a right or left hand swinging door. When the locking device is used in connection with the bolt, the block 6 is to be secured thereto. It may be secured by means of a pin 7, passed through a slot in the inner face-plate of the lock-casing and through perforations in the bolt and block. The block 6 is provided with a concaved recess 8 to receive a locking-ball 9. This locking-ball is guided in its movements by means of a raceway 10, the walls of which are curved, and preferably, as shown in Fig. 1, the walls have an upward and rearward inclination, or, in other words, an inclination in the direction of the movement of the bolt 2 in its unlocking movement. Extended through the door and into the lock-casing is an operating-spindle 11. This spindle has a rotary motion and also a slight longitudinal motion, as will be hereinafter described. Mounted loosely on the portion of the spindle 11 within the lock-casing are the tumbler-disks 12 and 13. The disk 12 is provided with a peripheral notch 14, designed to receive about one-half the circumference of the ball, and the disk 13 is provided with a similar peripheral notch 15. Carried by the spindle 11, between the disks, is an arm 16, having laterally-extended fingers 17 18, the finger 17 being designed to be engaged in a perforation 19, formed in the disk 12, while the other finger 18 is designed to be engaged in a similar perforation in the disk 13. The ball 9 is normally held in the raceway, and consequently in the notch formed in the block 6, by means of a spring-arm 20, extended from the lock-casing, and this spring-arm has a downward extension 21, the end of which is arranged within the line of movement of the end of the arm 16, the purpose of which will be hereinafter described, and this point of contact may be regulated by means of a set-screw 22, operating in the wall of the lock-casing. To prevent any possible accidental turning of a tumbler-disk, I employ a brake consisting of a wedge-shaped head 23, extended upward and engaging against the inner surfaces of the disks. This head is mounted on a swinging arm 24, which may be raised or lowered by means of a set-screw 25. In case of a mortise-lock this brake may be inserted or regulated through an opening in that edge of the lock-casing next to the door-casing. Arranged on the outer side of the door is an indicating-disk 26, through which the spindle 11 has longitudinal movement, but has locking engagement therewith, so that the disk may be rotated with the spindle. The disk may be provided with suitable numerals or other indicating devices, that coact with numerals irregularly placed on a ring 27, surrounding the indicating-disk and of course held stationary. Lugs 28 extend from the ring 27 and engage upon the surface of the indicating-disk, so as to prevent its outward movement. To provide for the locking connection between the disk and the spindle, I have here shown a series of radial notches 29 around the center opening of the disk, (see Fig. 12,) and in these notches teeth 30, secured to the spindle, are designed to engage. Obviously the combination of the lock may be readily changed by removing the indicator-disk from its engagement with the teeth 30 and then rotating the disk and spindle relatively to each other and again locking them. In the operation of this device the spindle is first to be moved longitudinally. In this case, I will say, it is first to be moved longitudinally inward, engaging the finger 17 of the arm 16 with the disk 12, and as this finger reaches the perforation in said disk it will enter the perforation, and therefore the disk will be carried with the rotary movement of the spindle, so that a person understanding the combination may rotate the spindle until the proper points between the indicator device and the ring 27 are coincident, which will indicate that the notch 14 in the disk 12 is opposite the ball 9; but said ball will not drop into the depression or recess, because it is held up by the periphery of the other disk, and, further, it is held up by means of the spring 20. Now the spindle is to be drawn longitudinally outward, moving the arm 16 along the disk 13 until the finger 18 enters the perforation of said disk 13, when this disk 13 may be turned in the same manner as the first disk to bring its recess or notch 15 in line with the ball 9. When the parts are in this position, the fingers of the arm 16 should be disengaged from their respective perforations in the disks, and the spindle is to be rotated until the arm 16 engages with the projection of the spring 20, so that by continued rotary motion of the spindle the spring 20 will be moved downward, permitting the ball to drop into the recesses 14 and 15, in which position it will be entirely free of the keeper-block 6, so that the locking-bolt 2 may be readily moved to unlock the door. It may be here stated that the spring 20 and its connections may be omitted, and yet a practical lock will be provided. The spring if used may also be utilized to sound an alarm. On omitting the spring, of course, the ball will fall by gravity into the recesses 14 15. Then when it is desired to relock the parts motion is imparted to the disks to force the ball upward into the notch or recess 8 of the keeper-block, and this will be materially aided by the inclined walls of the raceway.

In Fig. 3 I have shown the lock as particularly adapted for use in connection with a drawer or similar device. Referring thereto, 31 indicates the drawer, 32 the lock-casing, secured to the inner side of the front wall of the drawer, and 33 indicates the keeper, which is fixed and has a recess 34 to receive the locking-ball 35. The disks 36 37 in this instance are made concavo-convex, and as they are preferably made of thin steel or similar resilient material they may be readily spread apart to receive the ball between them, as will hereinafter appear. These tumbler-disks 36 and 37 are mounted on a spindle 11, carrying the parts and operating in the same manner as the spindle first described. It will be noted that the keeper-block 33 is curved downward and inward at its outer end. In the operation of this device when it is desired to close the drawer it will become automatically locked, because the ball in the inward movement and carried by the lock will engage against said curved end, causing the ball to be forced downward between the tumbler-disks. When the ball reaches the recess 34, however, the resiliency of the plates will cause it to move outward to engage in said recess 34, and therefore the drawer cannot be moved outward without first manipulating the lock, because if the attempt were made the ball would engage against the wall 38 of the raceway.

In Fig. 5 I have shown the lock as designed for a safe-door, store-door, or the like, and this lock is so arranged that it will be necessary, if desired, that two persons have the combination, or, in other words, one person have one combination and another person another combination, thus making the device particularly safe. In this instance notched tumbler-disks 39 and 40 are arranged in the casing 41, and movable in this casing 41 is the locking-bolt 42, carrying on its lower side a keeper-block 43, which has an arm connection 44 with a knob-spindle 45. This keeper-block 43 is provided with two recesses or notches 46 47, adapted to receive locking-balls 48 49, which are guided in their movements by raceways 50 51. As the raceway 50 is arranged considerably rearward of a center line drawn through the tumbler-disks, it is made somewhat longer than the raceway 51, and therefore in this raceway 50 there is an extra ball 52. This is designed to pass into the recesses of the tumbler-disks, while the ball 48 passes out of the recess in the keeper-block. In the operation of this lock the recesses of all the disks should be put in combination or opposite one another under the ball in the chamber 47 and that ball rolled into chamber 51 out of the way. This is done by rotating one disk slowly and the ball will carry the others along with it until the mouth of this chamber is reached, when the ball will be forced into it. Then another combination is formed under the opposite raceway 50, when the balls will drop down, releasing the holding-bolt.

In Figs. 6 to 9 I have shown my invention as applied to a padlock. Referring to said figures, 55 indicates the lock-casing, which may be made of any desired shape, and having swinging connection with the casing is the shackle 56. In some locks, however, this shackle may have a sliding movement. The free end of this shackle is what I term the "keeper portion," and in this keeper portion is formed a recess 57 to receive the locking-ball 58, which is movable in a raceway 59. Arranged in this casing are the notched tumbler-disks 60 and 61, which are mounted on a spindle 11, carrying the arm having the fingers for engaging in the perforations of the disks, as heretofore described, and these disks are held from accidental rotary motion by means of a brake-wedge 23, similar to that first described. These disks 60 and 61, like the disks heretofore described, are resilient, so that the locking-ball may move between them, and to permit of the outward-springing movement of the disks by the engagement of the ball between the same it will be noted in Figs. 8 and 9 that the inner opposite walls of the lock-casing at this point are farther apart than at other points. A spring 62 is mounted in the casing and has a portion extended between the tumbler-disks for forcing the locking-ball outward to its locking position—that is, this spring will assist the outward movement, although such a movement will occur by the operation of the tumbler-disks if the spring is omitted. The spring at its free end may engage loosely against the ball, or it may be attached thereto. The spring has a return member 63, designed to be engaged by the arm carried by the spindle 11, and this return member 63 is connected to the main portion of the spring 62 by a strip 64. The main portion of the spring at a point between the return member 63 and the securing-pin 65 for the spring has a finger-piece 66 extended outward through an opening 67 in the lock-casing. In the operation of this device the tumbler-disks are to be rotated by means of the spindle until their notches come in line with the locking-ball. Then by pressure on the extension 66 of the spring its portion 63 may be sprung upward into the line of movement of the arm on the spindle, so that when said arm comes in contact with said part 63 and a rotary motion of the spindle is continued the spring 62 will be drawn inward, permitting the ball to fall into the notches or recesses of the tumbler-disks. Of course this will free the shackle 56, so that it may be opened. In moving the shackle to its closed position it will become automatically locked, because during such movement it will force the locking-ball inward between the tumbler-disks until the recess 57 comes in line with the locking-ball. Then the pressure of the disks aided by the spring 62 will force said ball outward to its locking position. Fig. 7 shows substantially the movements of the parts for this automatic locking.

In some instances I may employ three disks, as I have shown in Fig. 10. In connection with the disks 68 and 69 I employ a center disk 70. The outer disks 68 and 69 are similar to those heretofore described, excepting that they are outwardly dished at their central portions, as indicated in Fig. 10. The several disks are provided with peripheral notches, and the center disk 70 is engaged with an arm 16$^a$, mounted on the spindle 11. This arm 16$^a$ is provided between its laterally-extended fingers with a notch to receive a spring-tongue 71 on the center disk. This spring, which is light, is designed to hold the finger or arm 16 normally out of the perforations in the other two disks. In this device the disks 68 and 69 are first turned, as before described, to bring their notches in line with the locking-ball, after which the center disk is to be turned to bring its notch into line with the ball. Then the ball will move by gravity into the notches or recesses, releasing the locking mechanism.

Figure 12 clearly shows a means for causing the clicking noise of the indicator-disk when rotated, so that a person familiar with the combination may operate the same in the dark. The edge of the disk has at its periphery a series of inwardly-turned teeth 72, designed to engage with a click-spring 73, so that as the teeth are moved over the spring or the spring passes from one tooth to another the sound will be made. One of the teeth 72 is made considerably longer than the other teeth, which will indicate a starting-point to manipulate the combination.

I have heretofore stated that the relative position of the indicator-disk to the spindle may be changed by removing the disk and then turning it and again engaging the teeth of the spindle in the radial notches of the disk. In Figs. 13 and 14, however, I have shown a different means. In these figures the spindle 11 is rigidly attached to a plate 74, which is secured to the indicator-disk 75 by means of screws 76. The disk 75, as indicated in Fig. 12, is provided with a series of holes to receive the screws. Obviously by turning the plate 74 relatively to the disk the combination may be easily changed. There may be five or ten holes in the indicator-disk, so that the two plates will act like a vernier and the number of combinations be greatly increased.

Figure 15:
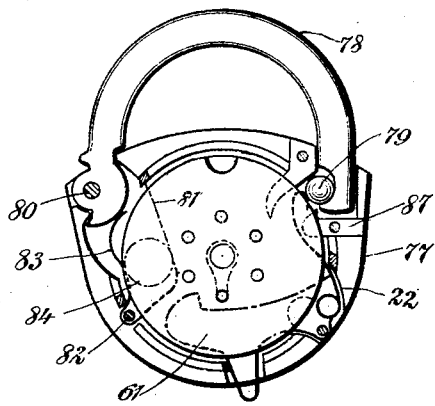

In Figs. 15, 16, 17, and 18 I further illustrate my invention as applied to a padlock. Any kind of closed case 77 may be used, and substantially the usual form of shackle 78 may be used. The case here shown, however, is made in two sections and may be arranged to be secured together in a circle passing through or nearly through the center of the ball 79 when in its locking position or in the chamber at the head of the raceway, so that the case cannot be put together or taken apart unless the ball is in the recesses of the disks 60 61, as heretofore described, or at the foot of the raceway. Fig. 15 shows the lock with a section of the case unscrewed or removed and the disks turned in locking position, and this figure also shows a peculiar form of the pivot end of the shackle designed to provide an opening into the lock when the shackle is removed; but which can be done only when the keeper portion is unlocked and revolved back from the ball. The shackle is pivoted on the pin 80, which may be taken out and the shackle then removed. This opening is especially desirable in a case that is riveted together, as it provides access to the disks, so that friction may be applied to them for adjustment. A wire 81 is attached to the upper part of the case and passes between the disks and after making a loop around a pin 82 is to be again turned up, as at 83, thus forming between the disks a pocket into which a block 84 of leather, wood, or metal may be inserted and held out of contact with the shackle.

Figure 16:
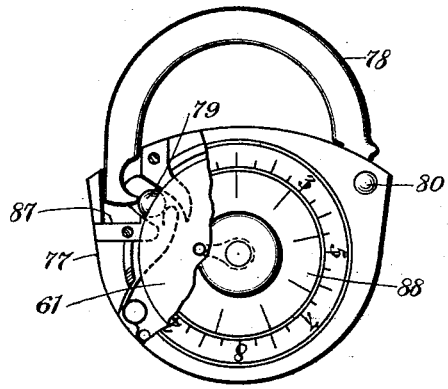

It is believed that a brake giving a clicking noise when the disks are revolved against it will obviate the need of a spring 62, as heretofore described, and therefore in Fig. 19 I have shown a disk 85 having radial ribs 86, so as to make a clicking noise when revolved against a yielding metallic brake or projection, and such a metallic brake may take the place of the wire 81. This lock is self-locking and has but two disks, which are separated about half the diameter of the ball, so that when the ball is in its locking position, as in Fig. 15, the shackle may be forced down on the ball, forcing it between the two disks, as shown in Fig. 16. When the end of the shackle is down against a plate 87, the resiliency of the disks will force the ball into the upper part of its raceway and the notch in the shackle.

Figure 17:
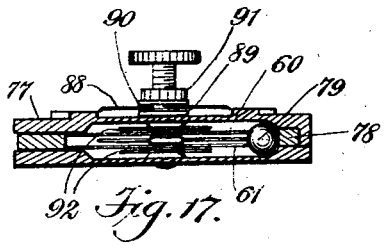
Figure 18:
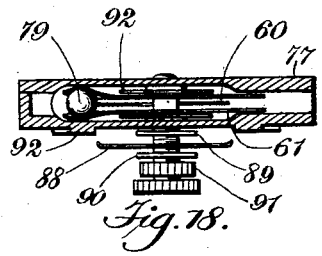
Figure 19:
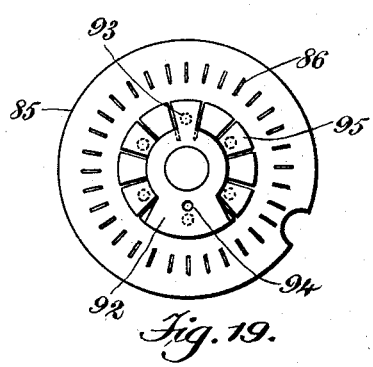

Figs. 17 and 18 show another method of fastening an indicating-disk 88 to the shaft or spindle. The collar 89, roughened on its outer surface, is made fast to the spindle. The disk 88 rests on this collar and under another collar 90, which is engaged by the nut 91 on a threaded portion of the spindle. The disk 88 may be made with or without clicking devices. In Fig. 16 it is shown with indicating-marks not coincident with those of the dial, which is preferable. Of course a movement of the disk changes the combination; but I do not confine myself to this method, as I may insert two thin disks movable on the spindle between the disks 60 61 and their respective sides of the lock-case. These disks are shown at 92 in Figs. 19, 20 and in place in Figs. 17, 18. These disks are made of thin metal sheets bent double and having the periphery of the inner section divided, as shown, to make it more flexible. On the inner side of each disk 92 there is a rounded projection 93, adapted to engage in any one of a series of holes in the disks 60 61. Opposite this projection there is hole 94 through the disk, but out of line with the circle of holes in the tumbler-disks. The projection 93 more or less closes the hole in which it may be resting, and hence makes that a starting-point from which the other holes in the tumbler-disks may be counted by touch of the fingers on the arm 16, heretofore described, and the fingers inserted in that hole which then may be the true one for putting the lock into combination by the indicating devices on the outside of the lock. Through each side of the lock-case there is a small hole equally distant from the spindle as is the hole 94. When it is desired to change the combination, a bent wire may be inserted in this hole in the case and the spindle slowly revolved until the end of the wire drops into the hole 94. Then the tumbler-disk at that side is revolved, dislodging the projection 93 from the hole it was filling until this projection drops into the hole it may be desired to obstruct, thus making a new starting-point and destroying the previous combination. Other holes in the tumbler-disk are closed on the outside by the yielding segments 95, which will yield under pressure, so the fingers on the arm 16 can be easily held in the holes. Disks 92 may be also held and prevented from turning by a thin bar or block inserted through an opening in the casing and in case of a padlock through the opening made by removing the shackle.

In some instances the arm 16 need not trip on the spring 22, and that whatever does trip it should not in all locks be of the same distance from the arm. Hence in Fig. 21 I make an arm out of the pin through arm 16$^b$. Tumbler-disks in other forms may have a plurality of holes, and disks 92 may be used in connection with the outer disks in any form of lock.

Having thus described my invention, I claim as new and desire to secure by Letters Patent—

1. A lock, comprising a notched keeper, a plurality of tumbler-disks, each having a notch in its periphery, a locking-ball, and means for rotating the disks one independently of another to bring the several notches in alinement, substantially as specified.

2. A lock, comprising a notched keeper, a plurality of resilient notched tumbler-disks, a ball adapted to engage in the notches, a spindle on which the disks are loosely mounted, and a disk-shifting device carried by the spindle, substantially as specified.

3. A lock, comprising a notched keeper, a plurality of notched tumbler-disks, a ball adapted to engage in the notch in the keeper and in the notches of the disks, a spindle on which the disks are loosely mounted, and an arm mounted on the spindle between the disks and adapted to be engaged with the disks to rotate them one independently of the other, substantially as specified.

4. A lock comprising a locking-bolt, a keeper carried by the bolt and having a notch or recess, a locking-ball adapted to engage in said notch or recess, a raceway for directing the ball to said notch or recess, a spindle having a rotary and longitudinal movement, two disks mounted loosely on said spindle, each of said disks having a notch or recess in its periphery to receive the ball, and means carried by the spindle for locking it to a disk, substantially as specified.

5. A lock comprising a locking-bolt, a keeper-block carried by the bolt, the said keeper-block having a notch, a locking-ball adapted to engage in said notch, a raceway for directing the ball to the notch, a spindle, a plurality of tumbler-disks loosely mounted on the spindle, each of said disks having a notch in its periphery to receive the ball, means for locking the spindle to any one of the disks to cause a rotary movement of the disks with the spindle, a spring normally holding the locking-ball in the recess of the keeper-block, and means for moving said spring to permit the ball to move out of said recess in the keeper-block, substantially as specified.

6. A lock comprising a sliding bolt, a keeper-block carried by the bolt and having a notch, a spindle mounted to rotate and to have a longitudinal movement, tumbler-disks loosely mounted on said spindle, each disk having a peripheral notch and each disk having one or more perforations, an arm mounted on the spindle between the disks, and laterally-extending fingers on said arm for engaging in the perforations, substantially as specified.

7. A lock comprising a locking-bolt, a keeper-block carried by the bolt and having a notch or recess, a spindle, disks loosely mounted on said spindle and provided with peripheral notches, means carried by the spindle for locking it to a disk, and a brake device for engaging with the disks, substantially as specified.

8. A lock comprising a spindle, resilient tumbler-disks mounted loosely on said spindle, and provided with peripheral notches, an arm carried by the spindle between the disks, means for locking said arm with either one of the disks, a keeper having a notch or recess, a locking-ball adapted to engage in said notch or recess and also in the notches of the disks, and a brake, substantially as specified.

9. A lock comprising a casing, a locking-bolt, a keeper carried by said bolt and having a recess, a ball movable in the casing and adapted to engage in said recess, a spindle mounted to rotate in the casing and to have a longitudinal movement therein, a pair of tumbler-disks mounted loosely on the spindle within the casing, each of said disks having a peripheral notch to receive the locking-ball, an indicator-disk adjustably connected to the spindle, and a fixed indicating-ring within which said indicator-disk moves, substantially as specified.

10. A combination-lock comprising a keeper having a recess, a locking-ball adapted to engage in said recess, a spindle, tumbler-disks loosely mounted on said spindle, each of said disks having a peripheral notch to receive the locking-ball, means for placing the spindle in locking engagement with either one of the disks, an indicating-ring, an indicator-disk mounted to rotate within the ring, said indicator-disk having adjustable connection with the spindle, teeth around the edge of said indicator-disk, and a click-spring for engaging with said teeth, substantially as specified.

In testimony whereof I have signed my name to this specification in the presence of two subscribing witnesses.

JOHN WISDOM GONCE.

Witnesses:
I. N. HACKWORTH,
A. A. GONCE.